(12) United States Patent
Berkhahn et al.

(10) Patent No.: US 10,291,697 B2
(45) Date of Patent: May 14, 2019

(54) DECENTRALIZED DISCOVERY ACROSS DIFFERENT NETWORKS

(71) Applicant: INTERNATIONAL BUSINESS MACHINES CORPORATION, Armonk, NY (US)

(72) Inventors: Jonathan A. Berkhahn, San Jose, CA (US); Daniel S. Lavine, Campbell, CA (US); Simon M. Leung, San Jose, CA (US); Eugene Michael Maximilien, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 596 days.

(21) Appl. No.: 14/944,386

(22) Filed: Nov. 18, 2015

(65) Prior Publication Data
US 2017/0142199 A1    May 18, 2017

(51) Int. Cl.
*G06F 15/16* (2006.01)
*H04L 29/08* (2006.01)

(52) U.S. Cl.
CPC .......... *H04L 67/1063* (2013.01); *H04L 67/16* (2013.01)

(58) Field of Classification Search
CPC ..... H04L 41/50; H04L 63/0236; H04L 67/10; H04L 67/16; H04L 47/70; H04L 67/12; G06F 9/541; G06F 9/5055; G06Q 30/0631
See application file for complete search history.

(56) References Cited

U.S. PATENT DOCUMENTS

| | | | |
|---|---|---|---|
| 6,983,326 B1* | 1/2006 | Vigue | H04L 63/12 707/999.104 |
| 9,450,836 B2* | 9/2016 | Hammer | H04L 41/50 |
| 2007/0286100 A1* | 12/2007 | Saaranen | H04L 67/16 370/260 |
| 2012/0221636 A1 | 8/2012 | Surtani et al. | |
| 2014/0130038 A1 | 5/2014 | Lucovsky et al. | |
| 2014/0189116 A1* | 7/2014 | Niimura | H04L 67/16 709/225 |
| 2014/0189120 A1* | 7/2014 | Vicente | H04L 67/10 709/226 |
| 2014/0279201 A1* | 9/2014 | Iyoob | G06Q 30/0631 705/26.7 |
| 2014/0359129 A1* | 12/2014 | Sharma | H04L 47/70 709/226 |
| 2015/0043438 A1 | 2/2015 | Fwn et al. | |
| 2015/0193481 A1* | 7/2015 | McGrath | G06F 9/541 707/638 |
| 2016/0006800 A1* | 1/2016 | Summers | G06F 9/5055 709/203 |
| 2016/0006822 A1* | 1/2016 | Kloberdans | H04L 63/0236 709/204 |

OTHER PUBLICATIONS

AllJoyn; AllJoyn System Description; AllSeenAlliance; Sep. 26, 2014 and allseenalliance.org.
www.Wikipedia.com, Platform as a Service, Sep. 4, 2015.

* cited by examiner

*Primary Examiner* — Dustin Nguyen
(74) *Attorney, Agent, or Firm* — Grasso PLLC

(57) ABSTRACT

Dynamic discovery of peers or services in different networks, where few or no servers may be required for the discovering process, is provided. Broadcasting used for the peer or service discovery may serve to reduce centralized bottlenecks and may serve to increase scalability.

26 Claims, 4 Drawing Sheets

DECENTRALIZED DISCOVERY ACROSS DIFFERENT NETWORKS

BACKGROUND

The present invention relates to decentralized discovery across different networks and more specifically, to applications broadcasting and listening for packets suitable to identify other applications or services residing in different networks without the necessity of a centralized database.

Platform as a service (PaaS) is regularly considered a type of cloud-based computing where a platform already exists for clients or others to use when running or otherwise access world-wide-web applications. The PaaS is a shared universal platform that reduces the complication of generating and supporting a web-based application. Repetitive tasks directed to platform setup or maintenance can be reduced or eliminated through the use of PaaS, which may itself be established and maintained by third-party providers.

Applications may be specifically created for use on a public or a private PaaS environment. Public PaaS environments can include universal public infrastructure networks while private PaaS environments can include closed and secured private networks. In either instance, an application may be created and deployed through the existing PaaS environment in order to relieve an application programmer or deployment manager from network start-up, network maintenance, or other underlying network responsibilities.

BRIEF SUMMARY

Methods, devices and manufactures that support decentralized discovery across different networks are provided. Embodiments may include reusable designs that permit an application to dynamically discover other peer applications across a PaaS environment or other multiple-network environment. Embodiments may also include reusable designs that permit an application to dynamically discover available services across a PaaS environment or other multiple-network environment. Embodiments may provide for relatively low network loads where peers may dynamically discover each other in both their local networks and across outside networks. This peer discovery and service discovery may be possible, for example, when peers are located on different sub-networks.

Embodiments may broadcast to other peers or listen for broadcasts from other peers using existing conventional or unconventional communication layers. The communication layers employed may be a router communication layer.

In embodiments, applications may dynamically discover peers in different networks where few or no servers may be required for the discovering process and, in so doing, meaningfully reduce the frequency of emitting intermittent signals. Embodiments may also provide for minimal resource usage and the reduction or minimization of a backend data store. Still further, traffic may be minimized as signals may be broadcast only once, when new peers join. This broadcasting may serve to reduce centralized bottlenecks and may serve to increase scalability.

In embodiments a broadcaster for routing traffic to different applications and across different networks, may be employed. This broadcaster may also reach into different sub-networks and may allow applications previously unknown to each other to discover each other by sending or listening for packets containing the identity of the application, and the location of the application. In certain embodiments, peer applications may be different instances of the same application as well as unrelated applications having similar peer discovery accommodations.

Embodiments may also be employed for applications to self-discover services that are available to the application. These embodiments may include services broadcasting their identity and network location through a communication channel for receipt by many applications. These applications may receive a broadcast packet and may log the presence and address of the available service. This service broadcast and logging may be accomplished in conjunction with or independent of the peer-to-peer broadcast discovery discussed herein.

In embodiments complexity and network overhead may be reduced through limited or lack of use of a central database for storing and maintaining available services and active peer applications available across different networks. In embodiments services may be logged into a central database while active peer applications may not be and may be, instead, discoverable by other peer applications using the broadcast and packet configurations taught herein. Overhead may be reduced in embodiments through minimal or no repeated querying of central databases by peers and services in order for the peers or services to identify other like peers, available services, suitable applications, or other information available to the peers and services.

Many variations of the invention beyond those explicitly described are possible. Moreover, modifications to the embodiments described herein are also possible. These modifications and variants may include various combinations of the embodiments described herein, various modifications to the embodiments described herein, use of portions of embodiments described herein, and still further teachings of the application in other environments and uses.

DETAILED DESCRIPTION

Figure 1:
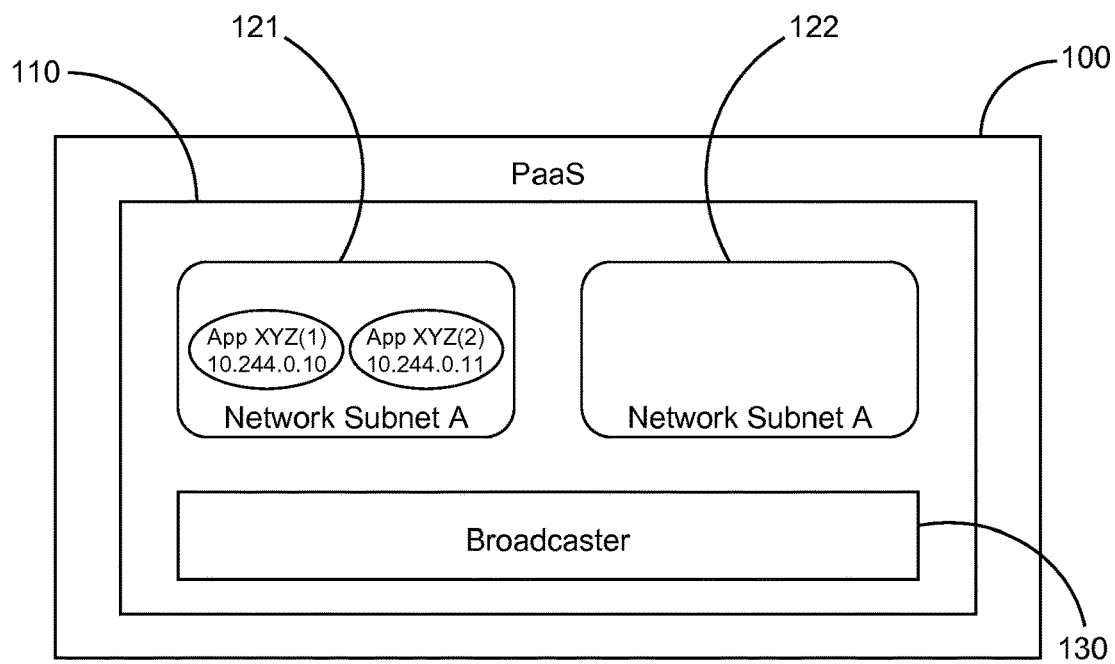
FIG. 1 is a schematic showing peer applications in the same subnet as may be discovering one another in various embodiments of the invention.

Methods, devices and manufactures that support decentralized discovery across different networks are provided. Embodiments may include reusable designs that permit an application to dynamically discover other peer applications across a PaaS environment or other multiple-network environment. Embodiments may also include reusable designs that permit an application to dynamically discover available services across a PaaS environment or other multiple-network environment. Embodiments may provide for relatively low network loads where peers may dynamically discover each other in both their local networks and across outside networks. This peer discovery and service discovery may be possible, for example, when peers are located on different IP sub-networks.

Embodiments may include reusable designs to allow applications to dynamically discover other peers within a Platform as a Service (PaaS). In embodiments, network burdens may be reduced and heavy network loads may be minimized. Each may be accomplished in embodiments by not requiring the applications within a PaaS or other decentralized system to host any discovery service functionality. In other words, the PaaS or decentralized system need not, for example, maintain a centralized database for tracking all available peers or other application instances and in so doing periodic querying across the network and maintenance of such a database may be reduced or eliminated.

Embodiments may reduce the overhead and load associated with discovering other running peers within a network. As noted, the application of central servers for peers to talk to, or discover each peer can be minimized or eliminated. Also, any related intermittent broadcasting of signals into the network for purposes of tracking may be reduced. In so doing, in embodiments, discovery solutions may enable reductions in the amount of resources for peer and service discovery.

Still further, embodiments may provide for discovery of peers and services across the same and different networks, including different IP subnets. In embodiments, a communication protocol, such as the router layer, or an unconventional software defined network may be used to for necessary communications and broadcasts from and between available peers and available services. This broadcast across existing communication layers can serve to reduce data stores in the backend. In certain embodiments, a broadcast across a router layer may include sending a signature across and to various other networks, where that signature may be recognized by peers who then use that signature as indicative of a now available peer or service. Likewise, when a peer or service becomes no longer available it may also, send a broadcast prior to logging out and when this signature is received the receiving peer may use it to indicate the other peer or the service is no longer available.

In embodiments, the routing layer within a PaaS may be designed to receive and broadcast discovery signals. Here, applications may send out a discovery signal on startup and a router may notify all running instances about the new peer application. In so doing, applications may then be able to discover other peer applications in different networks with the routing layer broadcasting discovery or other applicable signals to different networks.

Thus, in embodiments, the software routing layer within a PaaS may be designed to receive and broadcast discovery signals as a single packet or multiple packets. Upon arrival, new applications may send out a discovery signal once and the router may notify all running applications within the PaaS of the new peer application. As the router can broadcast the signal into all networks, all applications across different networks that recognize the signature can be informed of the new peer arrival.

Upon receipt of a broadcast signal, applications can choose how to act upon receipt of a peer arriving broadcast signal. In decentralized network embodiments, such as a PaaS environment, a router may be suitable to broadcast signals into the entire network, thereby reducing or eliminating the need to store peer information in a central data store at the router or elsewhere.

Embodiments may allow arbitrary applications to dynamically discover others as well as available services. In addition, embodiments may enable this discovery and communication to occur at levels above normal network communication protocols. Thus, a router or other communication scheme may be used to deliver the discovery signals to each application in the environment via a router without occupying underlying communication layers.

In embodiments, not every peer application needs to send or receive broadcast signals. For example, when six peers exist, only some of the peers, e.g., four, may be involved in the broadcasting or receipt of the discovery signals. Peers not involved, e.g., two, may have already indicated that peer discovery is not of interest to them or may have other reasons for not participating in the broadcast, listening, and discovery described herein.

Embodiments may be carried without requirements for specific language or specific use of binding libraries for purposes of identifying peers. For example, embodiments may not employ the required use of binding libraries for purposes of discovery.

Exemplary implementations may be as follows: (1) a peer to peer game is running within a PaaS and the embodiment is used to discover any other peer for that game that are available within the PaaS; (2) a social program with peer to peer video or chatting features is running and the embodiment is used to discover any other peer that are available within the PaaS for video or chatting; and (3) an automatic service discovery within PaaS (e.g. 3rd party database, analytic, big data service etc.) is running and the embodiment is used to discover any other peer that are available within the PaaS for purposes of using the automatic service.

FIG. 1 is a schematic showing peer applications in the same subnets as may be discovering one another in various embodiments of the invention. The schematic includes PaaS 100, network 110, subnet A 121, subnet B 122, and broadcaster 130. Visible in FIG. 1 are two instances of application XYZ which can communicate with each other within the same subnet. Also evident in FIG. 1 is that there is no application in subnet B. The broadcaster 130, which may be an IP router, may enable communications between subnet A and subnet B as well as between network 110 and other networks in the PaaS 100. The two instances of application XYZ may communicate with each other without the use of a router or other broadcaster.

Figure 2:
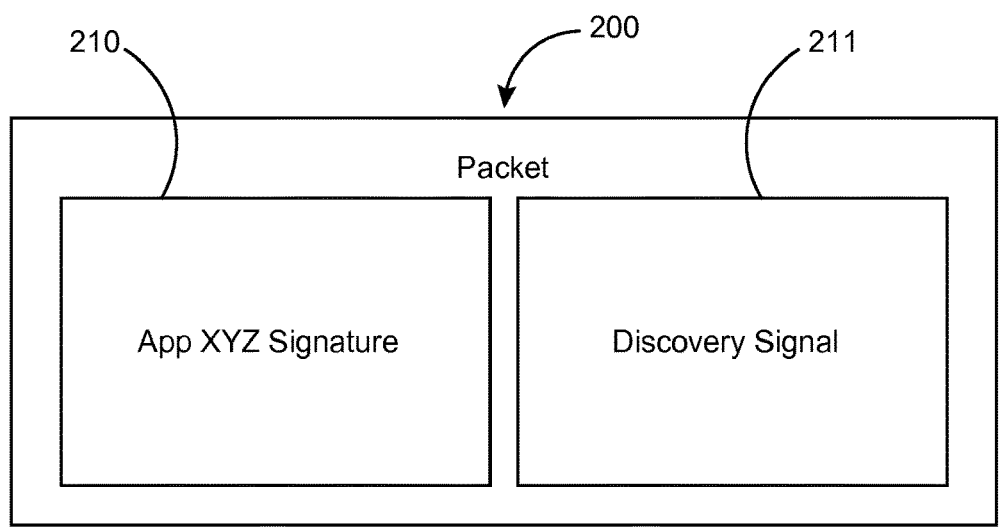
FIG. 2 shows a schematic of a packet that may be sent by an application or service for discovery by an application in a different subnet as may be employed in various embodiments of the invention.

FIG. 2 shows a schematic of a packet that may be sent by an application or service for discovery by an application in a different subnet as may be employed in various embodiments of the invention. The packet 200 as well as the application signature 210 or service signature 210, and the discovery signal 211, are each labeled in FIG. 2. In embodiments, a router or other broadcaster may listen for such a special packet, which may be configured as in FIG. 2, and may then broadcast the special packet for receipt by listening applications in the subnet, PaaS and elsewhere. The packet may be an eight bit packet as well as other sizes. Moreover, multiple packets may be used in embodiments to send the signature 210 and the signal 211. An advantage of keeping the two together is that additional header information may be reduced when a single packet is used rather than multiple packets to broadcast signature and signaling information.

Figure 3:
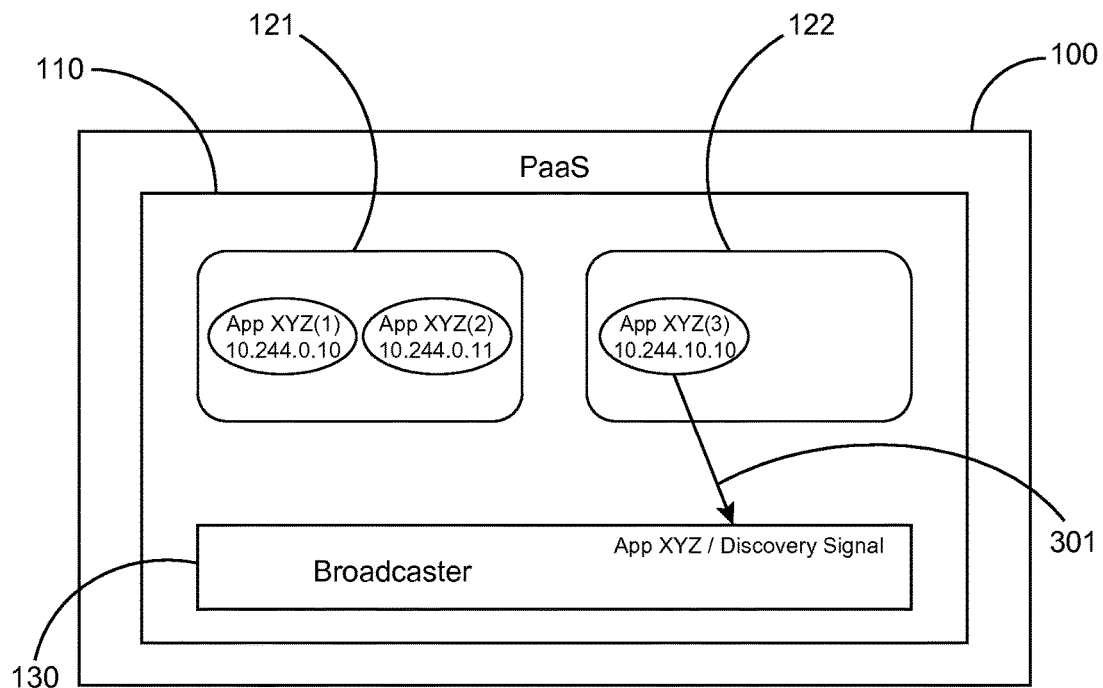
FIG. 3 is a schematic showing peer applications in different subnets and a packet as may be used to discover one another in various embodiments of the invention.

FIG. 3 is a schematic showing peer applications in different subnets and a packet as may be used to discover one another in various embodiments of the invention. FIG. 3 shows how the new application App XYZ (3) may be staged and running within the PaaS and may send out a discovery signal for any other potential application running XYZ. This discovery signal may be sent to the broadcaster, as is shown by arrow 301, and the broadcaster may subsequently transmit the signal to other subnets or other areas within the PaaS 110. This subsequent broadcasting is shown in FIG. 4 with arrows 401 and 402.

Figure 4:
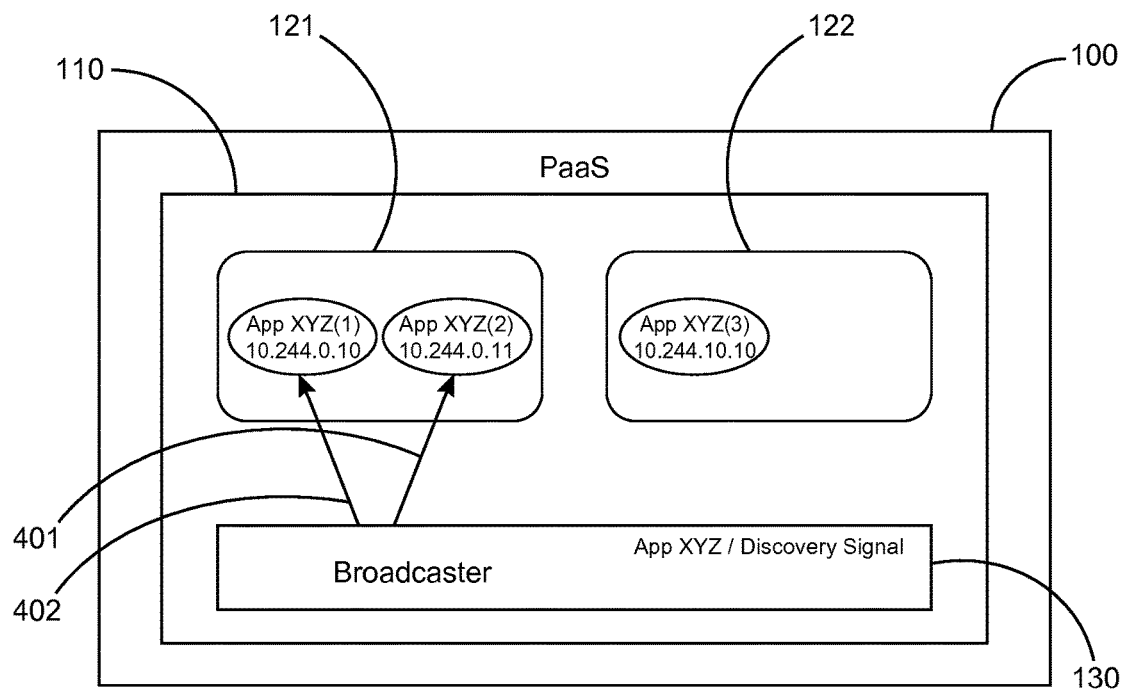
FIG. 4 is a schematic showing peer applications in different subnets and a packet as may be used to discover one another in various embodiments of the invention.

FIG. 4 is a schematic showing peer applications in different subnets and a packet as may be used to discover one another in various embodiments of the invention. Thus, in FIG. 4, a broadcaster routes the App XYZ signature to the network, and any applications running in the cloud that recognize the signature can act accordingly.

Figure 5:
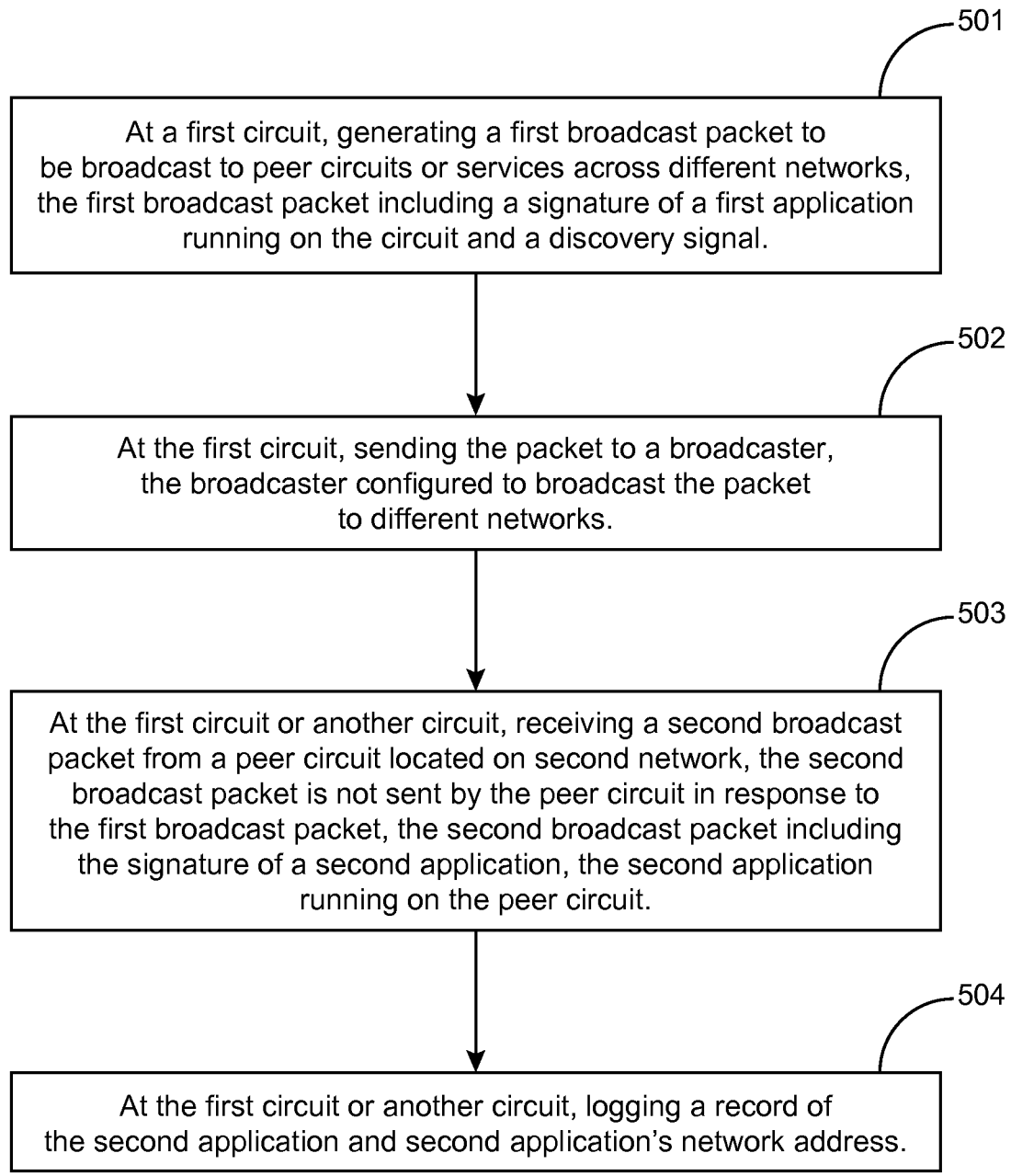
FIG. 5 shows various features of processes that as may be carried out in one or more systems employing embodiments of the invention.

FIG. 5 shows various features of processes that as may be carried out in one or more systems employing embodiments of the invention. As shown at 501, embodiments may include, at a first circuit, generating a first broadcast packet to be broadcast to peer circuits or services across different networks, the first broadcast packet including a signature of a first application running on the circuit, and a discovery signal. As shown at 502, embodiments may also include, at the first circuit, sending the packet to a broadcaster, the broadcaster configured to broadcast the packet to different networks. As shown at 503, embodiments may also include, at the first circuit or another circuit, receiving a second broadcast packet from a peer circuit located on second network, the second broadcast packet is not sent by the peer circuit in response to the first broadcast packet, the second broadcast packet including the signature of a second application, the second application running on the peer circuit. And, as shown at 504, embodiments may also include, at the first circuit or another circuit, logging a record of the second application and second application's network address.

Figure 6:
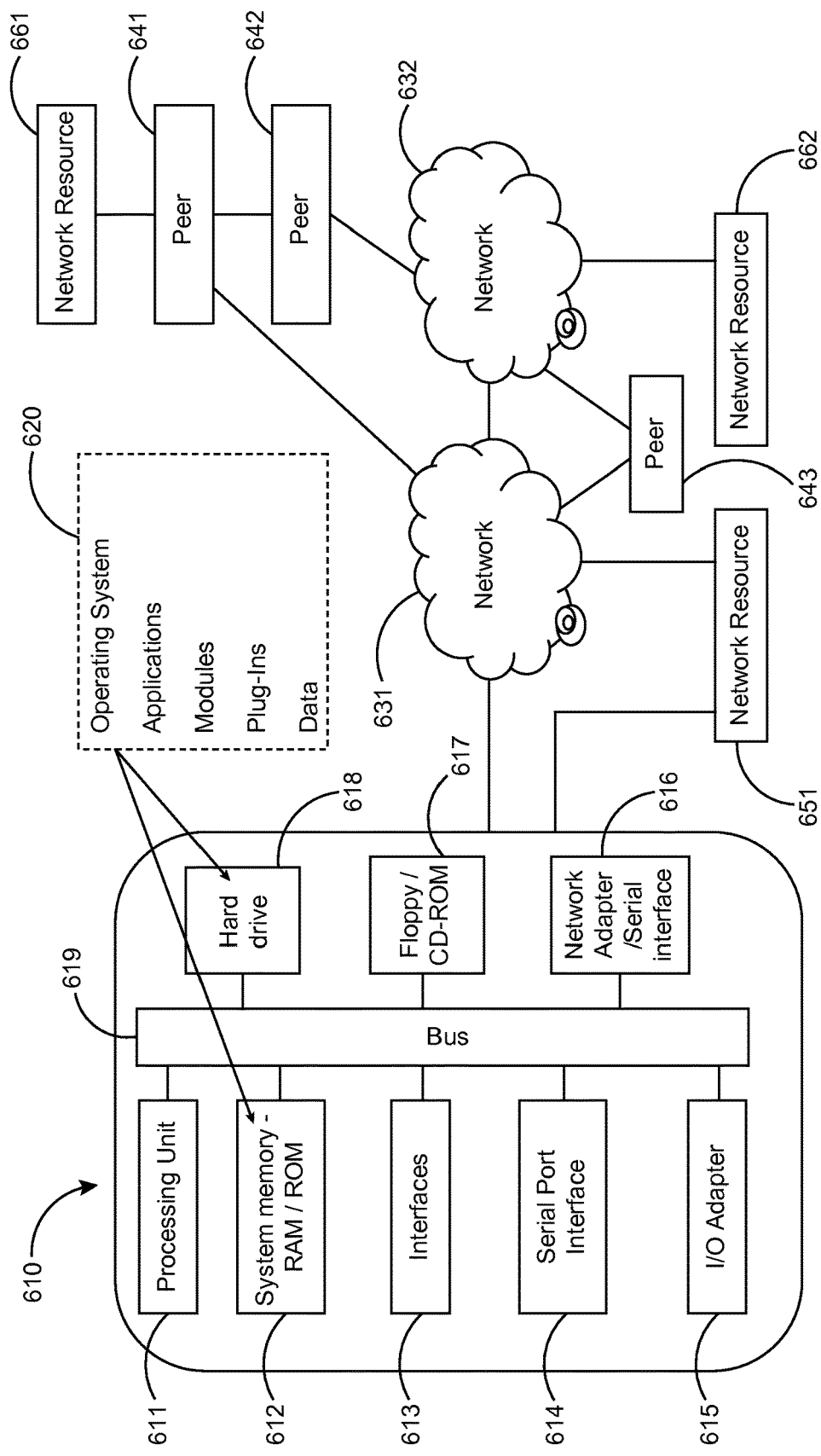
FIG. 6 shows a system, including multiple networks, as may be employed in accord with embodiments of the invention.

FIG. 6 shows a system, including multiple networks, as may be employed in accord with embodiments of the invention. This system of FIG. 6 includes peer 610, peers 641-643, network 631 and network 632, broadcaster 651, and network services or resources 661-662. Components and applications comprising peer 610 are also shown. These are processing unit 611, system memory RAM/ROM 612, interface drivers 613, serial port interface 614, I/O adapter 615, hard drive 618, floppy/CD-ROM 617, network adapter 616 and bus 619. Software loaded onto the hard drive 618 and/or system memory 612 is shown at 620 and includes an operating system, applications, modules, plug-ins, and data.

As can be seen in FIG. 6, the broadcaster may be directly connected to a peer and may be reachable to other peers through network 631 and/or network 632. In operation, the peers and the network resources may announce their presence though the broadcaster, which may be an IP router, using the signaling packet described above. Non-sending peers may listen for these signaling packets and may use them, when the packets are received, to manage applications running on the receiving peer. This management may include recognizing the presence of a peer or resource available in a different network and identifying a use of the application of the newly available peer or resource. This management may also include sending a return signal to the non-network peer to acknowledge its presence and receipt of the signaling packet.

The process software (decentralized discovery across different networks) is shared, simultaneously serving multiple customers in a flexible, automated fashion. It is standardized, requiring little customization, and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload. The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

The process software (decentralized discovery across different networks) may be deployed, accessed and executed through the use of a virtual private network (VPN), which is any combination of technologies that can be used to secure a connection through an otherwise unsecured or untrusted network. The use of VPNs improves security and reduces operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere), wherein the lifetime of the VPN is limited to a given period of time or a given number of deployments based on an amount paid.

The process software may be deployed, accessed, and executed through either a remote-access or a site to-site VPN. When using the remote-access VPNs, the process software is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed and executed through the use of dedicated equipment and large-scale encryption used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A computer program product for peer-to-peer discovery across different networks in a platform as a service (PaaS) cloud environment, the computer program product comprising a computer readable storage medium having program instructions embodied therewith, the program instructions readable by a circuit to cause the circuit to perform a method comprising:
   generating, by a circuit on a first network, a first broadcast packet to be broadcast to peer circuits across different networks, the first broadcast packet including a signature of a first application running on the circuit and a discovery signal;
   sending the packet to a broadcaster, the broadcaster configured to broadcast the packet to networks different than the first network;
   receiving, by the circuit, a second broadcast packet from a peer circuit located on second network, the second broadcast packet is not sent by the peer circuit in response to the first broadcast packet, the second broadcast packet including the signature of a second application, the second application running on the peer circuit, and
   logging, by the circuit, a record of the second application and second application's network address, or via an intermediary;
   wherein the broadcaster does not retain a database recording of the first application and the second application network address,
   wherein the circuit is operating in a PaaS environment,
   wherein the computer program product provides capacity to a user on a pay-as-you-go-model by providing access to a shared file system, containing the program instructions, from an accessed server.

2. The computer program product for peer discovery of claim 1 wherein the circuit does not query a remote central database to identify peer applications running on peer circuits located on a network other than the first network.

3. The computer program product for peer discovery of claim 1 wherein the first network and the second network are different sub-networks in a PaaS and wherein the broadcaster is a router communicating over a router communication layer.

4. The computer program product for peer discovery of claim 1 wherein logging by the circuit includes storing an identifier for the second application and an identifier for the network address of the second application.

5. The computer program product for peer discovery of claim 4 wherein the computer instructions further comprise:
   updating or removing a previously stored identifier for the second application after determining that the second application is no longer available to the circuit.

6. The computer program product for peer discovery of claim 1 wherein the circuit logs the record of the second application and second application's network address in a local database having the same sub-net address as the circuit.

7. The computer program product for peer discovery of claim 2 wherein the remote central database is located on a network different than the first network and wherein the first application and the second application are different instances of the same peer-to-peer application.

8. A computer method for peer-to-peer discovery across different networks in a platform as a service (PaaS) cloud environment, the computer method comprising:
   generating, by a circuit on a first network, a first broadcast packet to be broadcast to peer circuits across different networks, the first broadcast packet including a signature of a first application running on the circuit and a discovery signal;
   sending the packet to a broadcaster, the broadcaster configured to broadcast the packet to networks different than the first network;
   receiving, by the circuit, a second broadcast packet from a peer circuit located on second network, the second broadcast packet is not sent by the peer circuit in response to the first broadcast packet, the second broadcast packet including the signature of a second application, the second application running on the peer circuit, and
   logging, by the circuit, a record of the second application and second application's network address,
   wherein the broadcaster does not retain a database recording of the first application and the second application network address,
   wherein the circuit is operating in a PaaS environment,
   wherein the method is practiced by a user on a pay-as-you-go-model which allows the user to access a shared file system, containing pre-programmed method instructions corresponding to the above described elements, from an accessed server.

9. The computer method for peer discovery of claim 8 wherein the circuit does not query a remote central database to identify peer applications running on peer circuits located on a network other than the first network.

10. The computer method for peer discovery of claim 8 wherein the first network and the second network are different sub-networks in a PaaS and wherein the broadcaster is a router communicating over a router communication layer.

11. The computer method for peer discovery of claim 8 wherein logging by the circuit includes storing an identifier for the second application and an identifier for the network address of the second application.

12. The computer method for peer discovery of claim 11 wherein the computer instructions further comprise:
updating or removing a previously stored identifier for the second application after determining that the second application is no longer available to the circuit.

13. The computer program method for peer discovery of claim 8 wherein the circuit logs the record of the second application and second application's network address in a local database having the same sub-net address as the circuit.

14. The computer program method for peer discovery of claim 9 wherein the remote central database is located on a network different than the first network and wherein the first application and the second application are different instances of the same peer-to-peer application.

15. A computer system for peer-to-peer discovery across different networks in a platform as a service (PaaS) environment, the computer system comprising one or more computer readable storage medium having program instructions embodied therewith, the program instructions readable by a circuit to cause the system to perform a method comprising:
generating, by a circuit on a first network, a first broadcast packet to be broadcast to peer circuits across different networks, the first broadcast packet including a signature of a first application running on the circuit and a discovery signal;
sending the packet to a broadcaster, the broadcaster configured to broadcast the packet to networks different than the first network;
receiving, by the circuit, a second broadcast packet from a peer circuit located on second network, the second broadcast packet is not sent by the peer circuit in response to the first broadcast packet, the second broadcast packet including the signature of a second application, the second application running on the peer circuit, and
logging, by the circuit, a record of the second application and second application's network address,
wherein the broadcaster does not retain a database recording of the first application and the second application network address,
wherein the circuit is operating in a PaaS environment, wherein the computer system provides capacity to a user on a pay-as-you-go-model by providing access to a shared file system, containing the program instructions, from an accessed server.

16. The computer system for peer discovery of claim 15 wherein the circuit does not query a remote central database to identify peer applications running on peer circuits located on a network other than the first network.

17. The computer system for peer discovery of claim 15 wherein the first network and the second network are different sub-networks in a PaaS and wherein the broadcaster is a router communicating over a router communication layer.

18. The computer system for peer discovery of claim 15 wherein logging by the circuit includes storing an identifier for the second application and an identifier for the network address of the second application.

19. The computer system for peer discovery of claim 18 wherein the computer instructions further comprise:
updating or removing a previously stored identifier for the second application after determining that the second application is no longer available to the circuit.

20. The computer system for peer discovery of claim 15 wherein the circuit logs the record of the second application and second application's network address in a local database having the same sub-net address as the circuit.

21. The computer program product of claim 1, wherein the pay-as-you-go-model comprises executing the program instructions stored on the computer program product via transactions that contain data and server processing requests that use CPU units of time on the accessed server.

22. The computer program product of claim 1, wherein the pay-as-you-go-model comprises measuring any one or combination of network bandwidth utilized, memory usage, storage usage, packet transfers, and completed transactions for the accessed server.

23. The computer program method for peer discovery of claim 8, wherein the pay-as-you-go-model comprises executing the pre-programmed method instructions via transactions that contain data and server processing requests that use CPU units of time on the accessed server.

24. The computer program method for peer discovery of claim 8, wherein the pay-as-you-go-model comprises measuring any one or combination of network bandwidth utilized, memory usage, storage usage, packet transfers, and completed transactions for the accessed server.

25. The computer system for peer discovery of claim 15, wherein the pay-as-you-go-model comprises executing the program instructions stored on the computer program product via transactions that contain data and server processing requests that use CPU units of time on the accessed server.

26. The computer system for peer discovery of claim 15, wherein the pay-as-you-go-model comprises measuring any one or combination of network bandwidth utilized, memory usage, storage usage, packet transfers, and completed transactions for the accessed server.

* * * * *